(12) United States Patent
Chen et al.

(10) Patent No.: US 12,545,244 B2
(45) Date of Patent: Feb. 10, 2026

(54) COLLISION PREVENTION DEVICE, COLLISION PREVENTION METHOD AND COLLISION PREVENTION PROGRAM

(71) Applicant: TOYOTA JIDOSHA KABUSHIKI KAISHA, Aichi (JP)

(72) Inventors: Xi Chen, Nagoya (JP); Kazuya Okamoto, Toyota (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 253 days.

(21) Appl. No.: 18/232,359

(22) Filed: Aug. 10, 2023

(65) Prior Publication Data
US 2024/0059280 A1    Feb. 22, 2024

(30) Foreign Application Priority Data
Aug. 19, 2022   (JP) .................................. 2022-130974

(51) Int. Cl.
*B60W 30/09*     (2012.01)
*B60W 30/095*    (2012.01)

(52) U.S. Cl.
CPC ........ *B60W 30/09* (2013.01); *B60W 30/0956* (2013.01); *B60W 2420/403* (2013.01); *B60W 2420/408* (2024.01); *B60W 2554/402* (2020.02); *B60W 2554/80* (2020.02)

(58) Field of Classification Search
CPC ............. B60W 30/09; B60W 30/0956; B60W 2420/403; B60W 2420/408; B60W 2554/402; B60W 2554/80; B60W 2554/404; B60W 2556/20; B60W 30/18154; B60W 50/14; B60W 30/0953; G01S 13/931; G01S 13/867;
(Continued)

(56) References Cited

U.S. PATENT DOCUMENTS

| | | | |
|---|---|---|---|
| 6,345,233 B1 | 2/2002 | Erick | |
| 6,380,885 B2 * | 4/2002 | Shirai | ............... G01S 17/931 342/195 |
| 9,105,190 B2 | 8/2015 | Akiyama | |

(Continued)

FOREIGN PATENT DOCUMENTS

| | | |
|---|---|---|
| JP | 2001-516076 A | 9/2001 |
| JP | 2005-092516 A | 4/2005 |

(Continued)

*Primary Examiner* — Russell Frejd
*Assistant Examiner* — Ana D Thomas
(74) *Attorney, Agent, or Firm* — HAUPTMAN HAM, LLP

(57) ABSTRACT

A collision prevention device comprising a radar device that detects a three-dimensional object approaching in front of an own vehicle from the front side of the own vehicle, and an electronic control unit that executes a collision prevention assistance control that reduces a risk of the own vehicle from colliding with the three-dimensional object when it is determined that the own vehicle is likely to collide with the three-dimensional object, and the electronic control unit suppresses execution of the collision prevention assistance control when it is determined that the three-dimensional object is a group of moving bodies forming a row in a number equal to or greater than a reference value and that there is no track for a rail vehicle that intersects a road on which the own vehicle is traveling in front of the own vehicle.

12 Claims, 4 Drawing Sheets

(58) Field of Classification Search
CPC . G01S 2013/93271; G01S 2013/93272; G01S 2013/93274
See application file for complete search history.

(56) References Cited

U.S. PATENT DOCUMENTS

| | | | |
|---|---|---|---|
| 9,393,960 B2 | 7/2016 | Kodaira | |
| 9,483,945 B2 | 11/2016 | Okita et al. | |
| 9,873,412 B2 | 1/2018 | Moriizumi | |
| 10,671,084 B1* | 6/2020 | Fairfield | G05D 1/0212 |
| 10,793,147 B2 | 10/2020 | Kaminade et al. | |
| 2007/0143004 A1* | 6/2007 | Sakuma | G01S 7/412 |
| | | | 73/146 |
| 2008/0114531 A1* | 5/2008 | Kagawa | G08G 1/163 |
| | | | 701/119 |
| 2012/0213405 A1* | 8/2012 | Sasaki | G06T 7/262 |
| | | | 382/103 |
| 2016/0339909 A1 | 11/2016 | Matsunaga et al. | |
| 2017/0269602 A1* | 9/2017 | Nakamura | G01C 21/3492 |
| 2017/0278398 A1 | 9/2017 | Kato et al. | |
| 2018/0018888 A1* | 1/2018 | Townsend | G08G 7/02 |
| 2018/0165529 A1* | 6/2018 | Ishigami | G08G 1/0962 |
| 2018/0208223 A1* | 7/2018 | Israelsson | G08G 1/096783 |
| 2019/0102642 A1* | 4/2019 | Tanabe | H04N 13/239 |
| 2019/0135317 A1* | 5/2019 | Hilleary | G01S 13/62 |
| 2019/0180117 A1* | 6/2019 | Okada | G01S 13/931 |
| 2019/0212156 A1* | 7/2019 | Ghannam | B60K 35/28 |
| 2020/0255005 A1 | 8/2020 | Matsunaga | |
| 2021/0061309 A1 | 3/2021 | Kawanai | |
| 2021/0107521 A1 | 4/2021 | Fujita et al. | |
| 2021/0107528 A1 | 4/2021 | Fujita et al. | |
| 2021/0142268 A1* | 5/2021 | Brooks | G06Q 50/40 |
| 2021/0146956 A1 | 5/2021 | Fujita et al. | |
| 2021/0146958 A1 | 5/2021 | Tanaka et al. | |
| 2022/0318559 A1* | 10/2022 | Shen | G06V 20/58 |
| 2023/0115924 A1* | 4/2023 | Kiley | G08G 1/096775 |
| | | | 701/117 |
| 2025/0029277 A1* | 1/2025 | Foucard | B60W 60/001 |
| 2025/0033662 A1* | 1/2025 | Krüger | G01C 21/3407 |

FOREIGN PATENT DOCUMENTS

| | | | | |
|---|---|---|---|---|
| JP | 2016218629 A | 12/2016 | | |
| JP | 2017-174055 A | 9/2017 | | |
| JP | 2020-114105 A | 7/2020 | | |
| JP | 7676354 B2 * | 5/2025 | | G09B 29/00 |
| WO | 2019/069437 A1 | 4/2019 | | |

* cited by examiner

COLLISION PREVENTION DEVICE, COLLISION PREVENTION METHOD AND COLLISION PREVENTION PROGRAM

CROSS-REFERENCE TO RELATED APPLICATION

This application claims priority to Japanese Patent Application No. JP2022-130974 filed on Aug. 19, 2022, the content of which is hereby incorporated by reference in its entirety into this application.

BACKGROUND

1. Technical Field

The present disclosure relates to a collision prevention device, a collision prevention method and a collision prevention program.

2. Description of the Related Art

A collision avoidance device includes a detection device that detects objects around an own vehicle, and a control unit that, when it is determined that the own vehicle is likely to collide with an object detected by the detection device, performs a collision prevention assistance control such as issuing an alarm and automatic deceleration to avoid the collision. The determination of a risk of collision is also performed for an object approaching a front of the own vehicle from a front side of the own vehicle.

For example, Japanese Patent Application Laid-open No. 2016-218629 describes a collision prevention device that determines that there is no risk of collision between the one target and an own vehicle when a radar device simultaneously detects one target in front of the own vehicle and another target running in front of the own vehicle that is farther than the one target, and the two targets do not intersect (a difference in positions of the two targets in a lateral direction with respect to a direction of travel of the own vehicle is less than a reference value). According to this type of collision prevention device, in a situation where there is an elevated road above a road on which the own vehicle is traveling and the one target travels on the elevated road, a possibility that a collision prevention assistance control is performed unnecessarily can be reduced.

In a collision prevention device described in the above-mentioned Japanese Patent Application Laid-open publication, when one target, which is a preceding vehicle, can move without colliding with another target, it is determined that the own vehicle can also move without colliding with the other target. Therefore, in a situation where there is no preceding vehicle in front of the own vehicle, it cannot be determined whether or not the own vehicle is likely to collide with another target. Accordingly, even if another vehicle approaching from a side of the own vehicle is a train, monorail, or the like running on a track at a high altitude, it may be determined that the own vehicle may collide with the other vehicle, and a collision prevention assistance control may be unnecessarily performed. As a result, it is inevitable that an occupant or occupants may feel annoyed by unnecessary alert and the own vehicle may be unnecessarily decelerated.

In order to avoid an unnecessary execution of the collision prevention assistance control, it is conceivable to mount a radar device capable of detecting a height of another vehicle on the own vehicle. However, a radar device capable of detecting a height of another vehicle cannot help be an expensive radar device in which antenna elements are arranged at a plurality of positions with different heights.

SUMMARY

The present disclosure provides a collision prevention device, a collision prevention method and a collision prevention program improved so as to reduce a risk of unnecessary execution of a collision prevention assistance control without requiring presence of a preceding vehicle in a situation where a moving object such as a train moves across at a height different from that of the own vehicle.

According to the present disclosure, a collision prevention device comprising a radar device that detects a three-dimensional object approaching in front of an own vehicle from a front side of the own vehicle, and an electronic control unit that executes a collision prevention assistance control that reduces a risk of the own vehicle from colliding with the three-dimensional object when it is determined that the own vehicle is likely to collide with the three-dimensional object.

The electronic control unit includes a determination device that determines whether or not there is a track for a rail vehicle that intersects a road on which the own vehicle is traveling in front of the own vehicle, and the electronic control unit is configured to suppress execution of the collision prevention assistance control when it is determined that the three-dimensional object is a group of moving bodies forming a row in a number equal to or greater than a reference value and the determination device determines that there is no track for a rail vehicle that intersects the road on which the own vehicle is traveling in front of the own vehicle.

In addition, according to the present disclosure, a collision prevention method comprising a step of detecting a three-dimensional object approaching from a front side of an own vehicle, and a step of executing a collision prevention assistance control that reduces a risk of the own vehicle colliding with the three-dimensional object when it is determined that the own vehicle is likely to collide with the three-dimensional object.

The collision prevention method further comprises a step of determining whether or not there is a track for a rail vehicle that intersects a road on which the own vehicle is traveling in front of the own vehicle and a step of suppressing execution of the collision prevention assistance control when it is determined that the three-dimensional object is a group of moving bodies forming a row in a number equal to or greater than a reference value and that there is no track for a rail vehicle that intersects the road on which the own vehicle is traveling in front of the own vehicle.

Further, according to the present disclosure, a collision prevention program that causes an electronic control unit mounted on an own vehicle to execute a step of detecting a three-dimensional object approaching from a front side of the own vehicle, and a step of executing a collision prevention assistance control that reduces a risk of the own vehicle colliding with the three-dimensional object when it is determined that the own vehicle is likely to collide with the three-dimensional object.

The collision prevention program further comprises a step of determining whether or not there is a track for a rail vehicle that intersects a road on which the own vehicle is traveling in front of the own vehicle and a step of suppressing execution of the collision prevention assistance control when it is determined that the three-dimensional object is a group of moving bodies forming a row in a number equal to or greater than a reference value and that there is no track for a rail vehicle that intersects the road on which the own vehicle is traveling in front of the own vehicle.

According to the above collision prevention device, the collision prevention method and the collision prevention program, it is determined whether or not there is a track for a rail vehicle that intersects a road on which the own vehicle is traveling in front of the own vehicle, and when it is determined that a three-dimensional object is a group of moving bodies forming a row in a number equal to or greater than the reference value and that there is no track for a rail vehicle that intersects the road on which the own vehicle is traveling in front of the own vehicle, the execution of the collision prevention assistance control is suppressed.

Therefore, even in a situation where it is determined that the own vehicle is likely to collide with a three-dimensional object, when a three-dimensional object is a group of moving bodies that forms a row in a number equal to or greater than the reference value, and the moving bodies move at a height position different from that of the own vehicle, the execution of the collision prevention assistance control is suppressed. Accordingly, it is possible to reduce the possibility that the collision prevention assistance control is performed unnecessarily.

The suppression of the execution of the collision prevention assistance control may be achieved by reducing a control amount of the collision prevention assistance control, or may be achieved by reducing the control amount of the collision prevention assistance control to zero. In the latter case, it is possible to prevent the collision prevention assistance control from being performed, thereby preventing an occurrence of adverse effects due to the collision prevention assistance control being executed.

In addition, when it is determined that a three-dimensional object is a group of moving bodies forming a row in a number equal to or greater than the reference value, and it is determined that there is a track for a track vehicle in front of the own vehicle, the collision prevention assistance control is executed without being suppressed. Therefore, for example, in a situation where the own vehicle is approaching a railroad crossing and a train or the like is about to pass in front of the own vehicle, the collision prevention assistance control can prevent the own vehicle from colliding with the train or the like.

In one aspect of the present disclosure, the electronic control unit is configured to determine that the three-dimensional object is a group of moving bodies forming a row in a number equal to or greater than the reference value when it is determined that a number of moving bodies equal to or greater than the reference value moves in the same direction at the same speed and distances between the moving bodies are equal to or less than a reference distance.

According to the above aspect, it is determined that the three-dimensional object is a group of moving bodies forming a row in a number equal to or greater than the reference value when it is determined that a number of moving bodies equal to or greater than the reference value moves in the same direction at the same speed and distances between the moving bodies are equal to or less than a reference distance. Therefore, as compared to where it is determined that the three-dimensional object is a group of moving bodies such as a train when it is determined that a number of moving bodies equal to or greater than the reference value moves in the same direction at the same speed or distances between the moving bodies are equal to or less than the reference distance, it is possible to accurately determine whether or not the three-dimensional object is a group of moving bodies forming a row in a number equal to or greater than the reference value.

In another aspect of the present disclosure, the determination device includes an imaging device that captures an image of a front of the own vehicle, and is configured to determine whether or not there is a target in front of the own vehicle that indicates existence of a track for a rail vehicle based on the image captured by the imaging device.

According to the above aspect, the determination device includes an imaging device that captures an image of a front of the own vehicle, and is configured to determine whether or not there is a target in front of the own vehicle that indicates existence of a track for a rail vehicle based on the image captured by the imaging device. Therefore, based on the image captured by the imaging device, it is possible to determine whether or not there is a track for a rail vehicle that intersects a road on which the own vehicle is traveling in front of the own vehicle.

Other objects, other features and attendant advantages of the present disclosure will be readily understood from the description of the embodiments of the present disclosure described with reference to the following drawings.

DETAILED DESCRIPTION

A collision prevention device, a collision prevention method, and a collision prevention program according to an embodiment of the present disclosure will be described in detail below with reference to the accompanying drawings.

Figure 1:
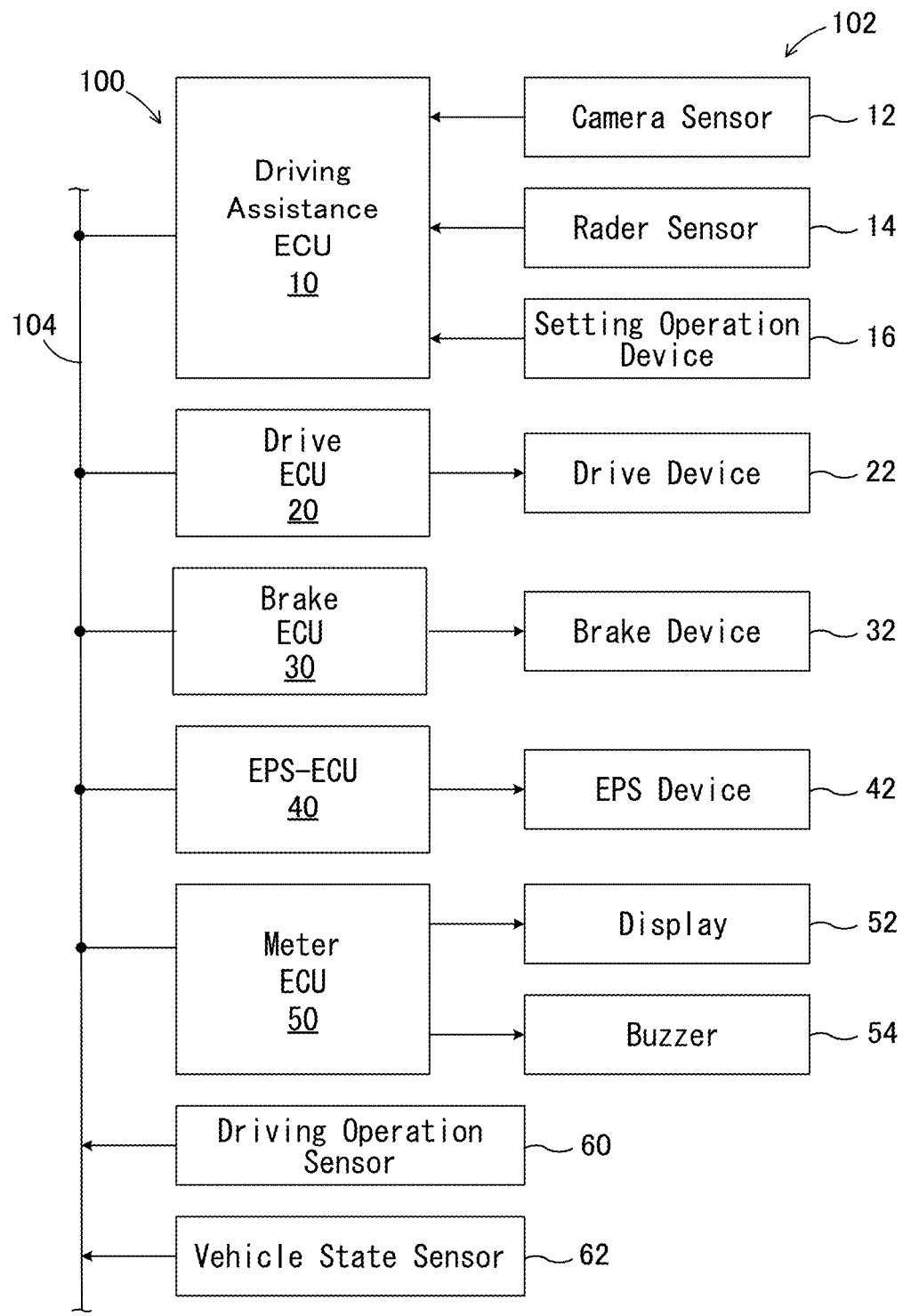
FIG. 1 is a diagram showing an embodiment of a collision prevention device according to the present disclosure.

As shown in FIG. 1, a collision prevention device 100 according to an embodiment of the present disclosure is applied to a vehicle 102 and includes a driving assistance ECU 10. The vehicle 102 may be a vehicle capable of autonomous driving. As shown in FIG. 1, the vehicle 102 includes a drive ECU 20, a brake ECU 30, an electric power steering ECU 40, and a meter ECU 50. ECU means an electronic control unit having a microcomputer as its main part. In the following description, the vehicle 102 will be referred to as own vehicle 102 as necessary to distinguish it from other vehicles, and the electric power steering will be referred to as EPS.

A microcomputer of each ECU includes a CPU, a ROM, a RAM, a readable and writable nonvolatile memory (N/M), an interface (I/F), and the like. The CPU implements various functions by executing instructions (programs, routines) stored in the ROM. Furthermore, these ECUs are connected to each other via a CAN (Controller Area Network) 104 so as to be able to exchange data (communicate). Therefore, detected values of sensors (including switches) connected to a specific ECU are transmitted to other ECUs as well.

The driving assistance ECU 10 is a central control unit that performs driving assistance control such as collision prevention control and lane keeping control. Camera sensors 12 and radar sensors 14 are connected to the driving assistance ECU 10. The camera sensors 12 include four camera sensors for capturing front, rear, right, and left sides, but are not limited to four. The radar sensors 14 as radar devices include five radar sensors for detecting three-dimensional objects existing in a front area and acquiring information thereof, a right front area, a left front area, a right rear area, and a left rear area, but are not limited to five. The camera sensors 12 and the radar sensors 14 function as surrounding information acquisition devices that acquire information such as targets around the vehicle 102.

Although not shown in the figure, each camera sensor of the camera sensors 12 includes a camera unit that captures images of the surroundings of the vehicle 102, and a recognition unit that analyzes the image data captured by the camera unit and recognizes targets such as white lines on a road and other vehicles. The recognition unit supplies information about a recognized target to the driving assistance ECU 10 every time a predetermined time elapses.

Each radar sensor of the radar sensors 14 has a radar transmitting/receiving unit and a signal processor (not shown). The radar transmitting/receiving unit emits radio waves in the millimeter wave band (hereinafter referred to as "millimeter waves") around the vehicle 102, and three-dimensional objects (for example, other vehicles, guardrails, etc.) existing within a radiation range, and receives reflected millimeter waves (i.e., reflected waves). Based on a phase difference between the transmitted millimeter wave and the received reflected wave, an attenuation level of the reflected wave, and a time from when the millimeter wave is transmitted to when the reflected wave is received, the signal processing unit acquires every predetermined time information concerning a distance between the own vehicle and a three-dimensional object, a relative speed between the own vehicle and the three-dimensional object, a relative position (direction) of the three-dimensional object with respect to the own vehicle, and the like, and supplies the information to the driving assistance ECU 10. LiDAR (Light Detection And Ranging) may be used instead of or in addition to the radar sensor 14.

Further, a setting operation device 16 is connected to the driving assistance ECU 10, and the setting operation device 16 is provided at a position to be operated by a driver. Although not shown in FIG. 1, the setting operation device 16 includes a collision prevention control switch, and the driving assistance ECU 10 executes collision prevention control when the collision prevention control switch is on.

The drive ECU 20 is connected to a drive device 22 that accelerates the vehicle 102 by applying driving force to drive wheels (not shown in FIG. 1). The drive ECU 20 normally controls the drive device 22 so that the driving force generated by the drive device 22 changes according to the driving operation by the driver, and when the drive ECU 20 receives a command signal from the driving assistance ECU 10, the drive ECU 20 controls the drive device 22 based on the command signal.

Note that the drive device 22 is not limited to a combination of an internal combustion engine and an automatic transmission. That is, the drive device 22 may be any drive device known in the art such as a combination of an internal combustion engine and a continuously variable transmission, a so-called hybrid system that is a combination of an internal combustion engine and a motor, a so-called plug-in hybrid system, a combination of a fuel cell and a motor, or a motor.

The brake ECU 30 is connected to a brake device 32 that decelerates the vehicle 102 by applying braking force to wheels (not shown in FIG. 1). The brake ECU 30 normally controls the brake device 32 so that a braking force generated by the brake device 32 changes according to a braking operation by the driver, and, when the brake ECU 30 receives a command signal from the driving assistance ECU 10, the brake ECU 30 performs automatic braking by controlling the brake device 32 based on a command signal. When braking force is applied to the wheels, brake lamps (not shown in FIG. 1) are turned on.

An EPS device 42 is connected to the EPS-ECU 40. The EPS-ECU 40 controls the EPS device 42 in a manner known in the art based on a steering torque Ts and a vehicle speed V detected by a driving operation sensor 60 and a vehicle state sensor 62, which will be described later to control the steering torque and reduce the drivers steering burden. Further, the EPS-ECU 40 can steer steered wheels as necessary by controlling the EPS device 42. Therefore, the EPS-ECU 40 and the EPS device 42 function as an automatic steering device that automatically steers the steered wheels as necessary.

Connected to the meter ECU 50 are a display 52 that displays a visual alert or the like indicating a state of the control by the driving assistance ECU 10 and a buzzer 54 that sounds an alert sound, when there is a risk of the own vehicle colliding with another vehicle. The display 52 may be, for example, a head-up display or a multi-information display that displays meters and various information, or may be a display of a navigation device.

The driving operation sensor 60 and the vehicle state sensor 62 are connected to the CAN 104. Information detected by the driving operation sensor 60 and the vehicle state sensor 62 (referred to as sensor information) is transmitted to the CAN 104. The sensor information transmitted to the CAN 104 can be appropriately used in each ECU. Note that the sensor information may be information of a sensor connected to a specific ECU, and may be transmitted from the specific ECU to the CAN 104.

The driving operation sensor 60 includes a drive operation amount sensor that detects an operation amount of an accelerator pedal, a braking operation amount sensor that detects a master cylinder pressure or a force applied to a brake pedal, and a brake switch that detects whether or not the brake pedal is operated. Furthermore, the driving operation sensor 60 includes a steering angle sensor that detects a steering angle $\theta$, a steering torque sensor that detects a steering torque Ts, and the like.

The vehicle state sensor 62 includes a vehicle speed sensor that detects a vehicle speed V of the vehicle 102, a longitudinal acceleration sensor that detects longitudinal acceleration of the vehicle, a lateral acceleration sensor that detects lateral acceleration of the vehicle, a yaw rate sensor that detects a yaw rate of the vehicle, and the like.

Figure 2:
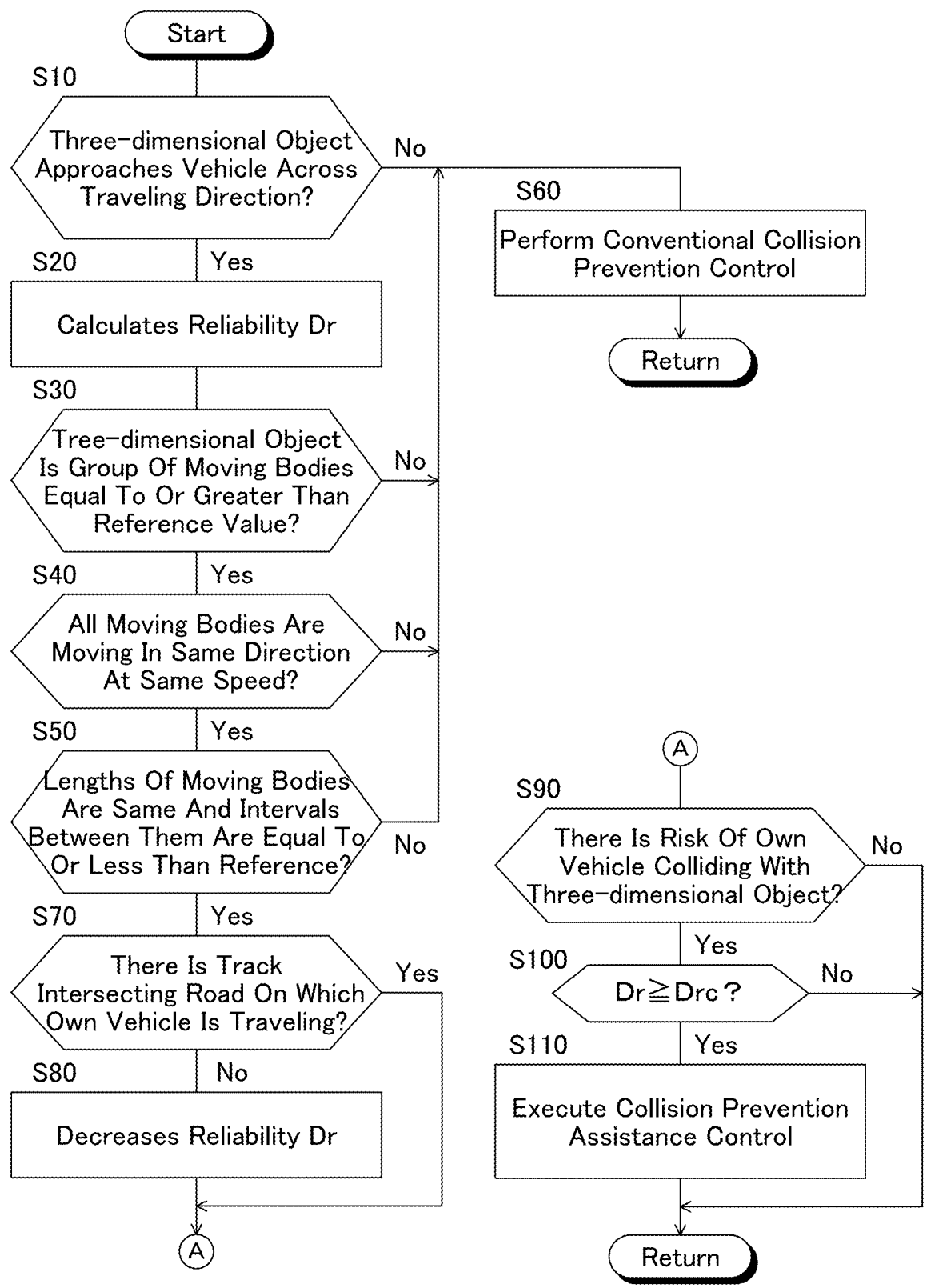
FIG. 2 is a flow chart showing a collision prevention control routine in the embodiment.

In the embodiment, the ROM of the driving assistance ECU 10 stores a collision prevention control program corresponding to the flowchart shown in FIG. 2, and the CPU executes the collision prevention control according to the program. The collision prevention control method according to the embodiment is executed by executing collision prevention control. In the following description, the collision prevention control will be referred to as present control.

Collision Prevention Control Routine in the Embodiment

Next, the collision prevention control routine in the embodiment will be described with reference to the flowchart shown in FIG. 2. The collision prevention control according to the flowchart shown in FIG. 2 is executed by the CPU of the driving assistance ECU 10 when the collision prevention switch (not shown in FIG. 1) is turned on.

Figure 3:
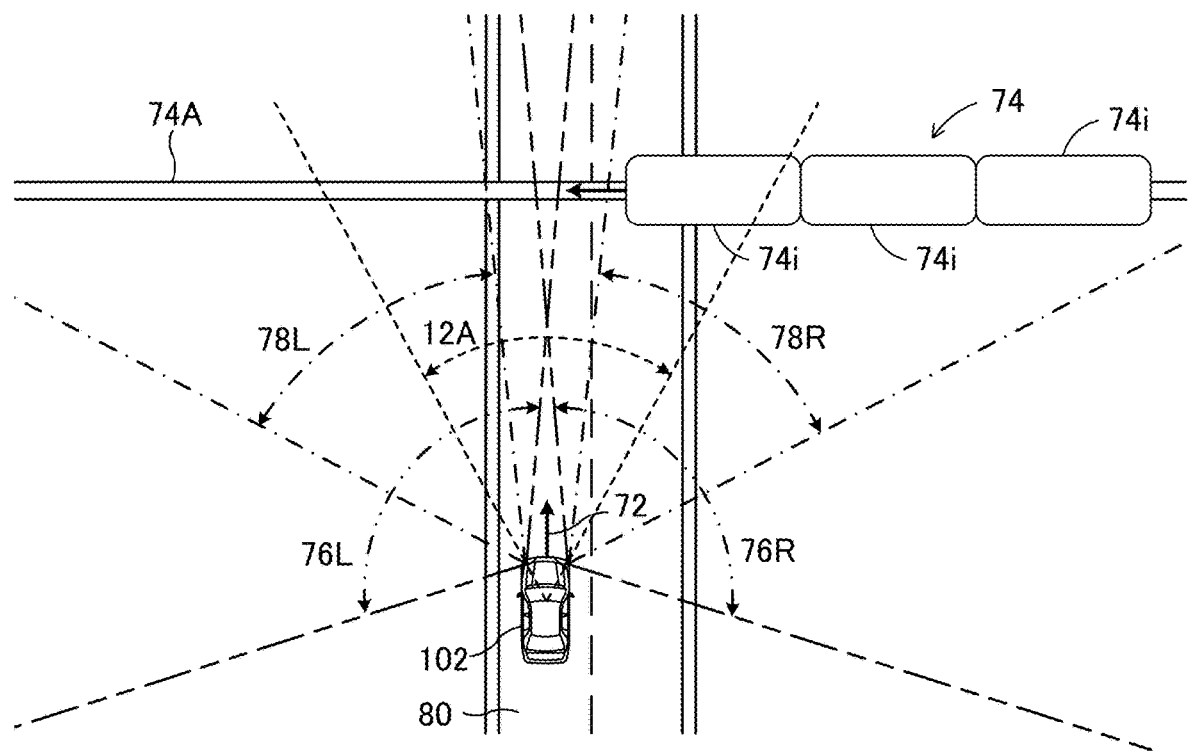
FIG. 3 is a diagram showing a situation in which a monorail, which is a three-dimensional object, crosses a traveling direction of the own vehicle from a front side on the right side of the own vehicle and approaches a front of the own vehicle.

First, in step S10, the CPU determines, based on a detection result of the radar sensor 14, whether or not there is a three-dimensional object 74 that approaches in front of the vehicle across a traveling direction 72 of the vehicle 102 from a front side of the vehicle, as shown in FIG. 3, for example. When the CPU makes a negative determination, the present control proceeds to step S60, and when the CPU makes an affirmative determination, the present control proceeds to step S20.

In FIG. 3, 76R and 76L indicate detection ranges of the radar sensor 14 for the right front area and the left front area, respectively, and 78R and 78L indicate ranges for determining the presence or absence of the three-dimensional object 74. As illustrated, the ranges 78R and 78L for determining the presence or absence of the three-dimensional object 74 may be part of the detection ranges of the radar sensors. In FIG. 3, 12A shows an example of an imaging range of the camera sensor 12 for imaging the front, and 74A shows a track of the three-dimensional object (monorail) 74.

In step S20, the CPU calculates reliability Dr of the detected three-dimensional object 74 based on at least a detection result of the radar sensor 14. In this case, for example, the higher the intensity of the millimeter wave reflected from the three-dimensional object, the higher the reliability Dr may be calculated, and the maximum value of the reliability Dr may be, for example, 100%.

In step S30, the CPU determines whether or not the detected three-dimensional objects 74 are a group of moving bodies that are equal to or greater than a reference value, i.e., whether or not the three-dimensional objects 74 are three-dimensional objects composed of moving bodies 74$i$ (i=-1, 2, . . . n (n is a positive constant)) equal to or greater than the reference value. When the CPU makes a negative determination, the present control proceeds to step S60, and when the CPU makes an affirmative determination, the present control proceeds to step S40. Note that the reference value may be a constant positive integer such as 2 or 3. It should be noted that determination of whether or not the three-dimensional object 74 is a three-dimensional object composed of the number of moving bodies 74$i$ equal to or greater than the reference value may be done, for example, by determining whether or not a length of the three-dimensional object 74 is equal to or longer than a reference length (positive constant) and whether or not an upper edge portion has a recess or recesses.

In step S40, the CPU determines whether or not all moving bodies 74$i$ of the three-dimensional object 74 are moving in the same direction at the same speed. When the CPU makes a negative determination, the present control proceeds to step S60, and when the CPU makes an affirmative determination, the present control proceeds to step S50.

In step S50, the CPU determines whether lengths of all moving bodies 74$i$ are substantially the same and intervals between all moving bodies are equal to or less than a reference interval (positive constant). When the CPU makes an affirmative determination, the present control proceeds to step S70, and when it makes a negative determination, the present control proceeds to step S60. It should be noted that if the reference value in step 30 is 2, the determination of whether or not the intervals between all moving bodies are equal to or less than the reference interval may be omitted.

Thus, in steps S30 to S50, it is determined whether or not the three-dimensional object 74 determined in step S10 to cross a traveling direction of the own vehicle 102 from the front side of the vehicle and approach the front of the vehicle is a group of moving bodies that form a row in numbers equal to or greater than the reference value, such as monorails and trains.

In step S60, when there is a risk that the own vehicle 102 will collide with a three-dimensional object that is not a group of moving bodies forming a row in numbers equal to or greater than the reference value, the CPU performs conventional collision prevention control to reduce the risk. The conventional collision prevention control may be any collision prevention control known in the art, such as the collision prevention control described in the above-mentioned Japanese Patent Application Laid-open publication.

In step S70, the CPU determines whether or not the camera sensor 12 that captures the image in front of the vehicle 102 detects a target indicating that there is a track for a rail vehicle that intersects a road on which the own vehicle is traveling. That is, the CPU determines whether or not a track for a rail vehicle exists in front of the own vehicle based on the image captured by the camera sensor 12. When the CPU makes an affirmative determination, the present control proceeds to step S90, and when it makes a negative determination, the present control proceeds to step S80. Therefore, the camera sensor 12 and the driving assistance ECU 10 (step S70) function as a determination device that determines whether or not there is a track for a rail vehicle that intersects the road on which the own vehicle is traveling in front of the own vehicle.

Note that when the camera sensor 12 captures an image of a road sign "There is a railroad crossing", a sign "Beware of a railroad crossing", a traffic light indicating a railroad crossing, and a target such as a crossing gate located in front of the own vehicle 102, it may be determined that there is a track for a rail vehicle that intersects the road on which the own vehicle is traveling. Therefore, when a road sign such as "There is a railroad crossing" is not imaged, it is considered that a track for a rail vehicle exists at a position higher than the road on which the own vehicle is traveling, so a negative determination is made in step S70.

Figure 4:
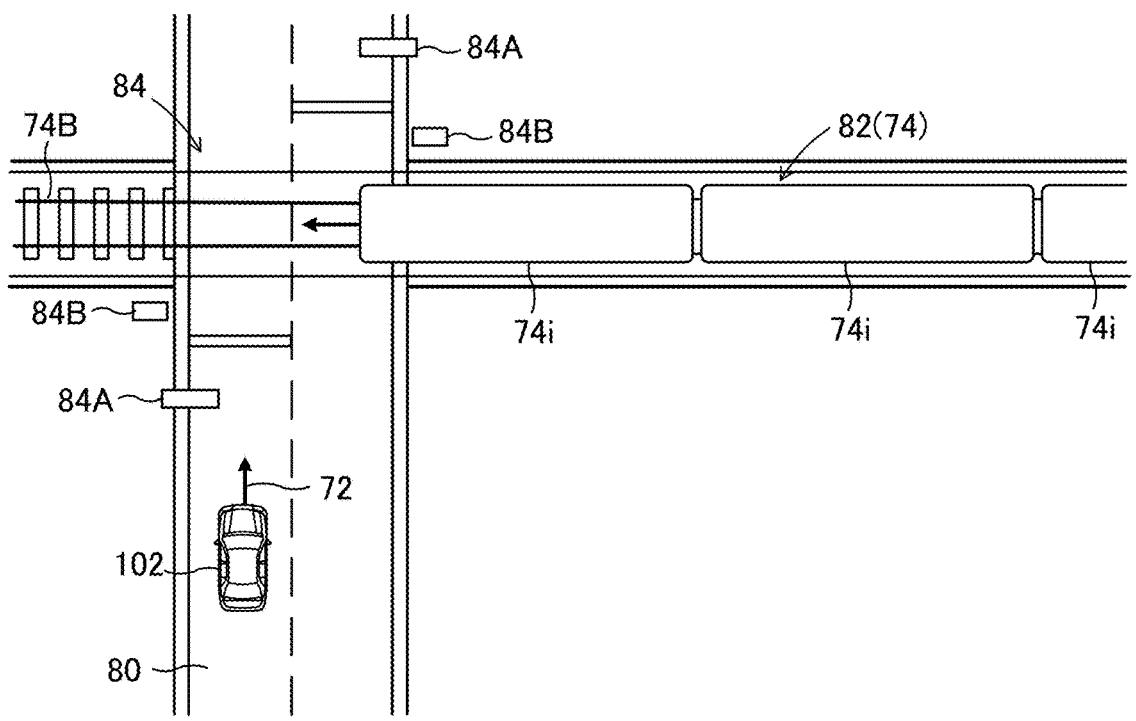
FIG. 4 shows a situation in which there is a train track that intersects a road on which the own vehicle is traveling, and a train as a three-dimensional object approaches the front of the own vehicle to cross a traveling direction of the own vehicle from the front right side.

FIG. 4 shows a situation in which there is a train track 74B that intersects a road 80 on which the own vehicle 102 is traveling, and a train 82 as a three-dimensional object 74 approaches the front of the own vehicle to cross a traveling direction of the own vehicle from the front right side. In this situation, affirmative determinations are made in steps S30 to S50, and there is a railroad crossing 84 in front of the own vehicle 102, a road sign 84A indicating "There is a railroad crossing", a traffic light 84B for the railroad crossing, etc., so that an affirmative determination is made in step S70.

Figure 5:
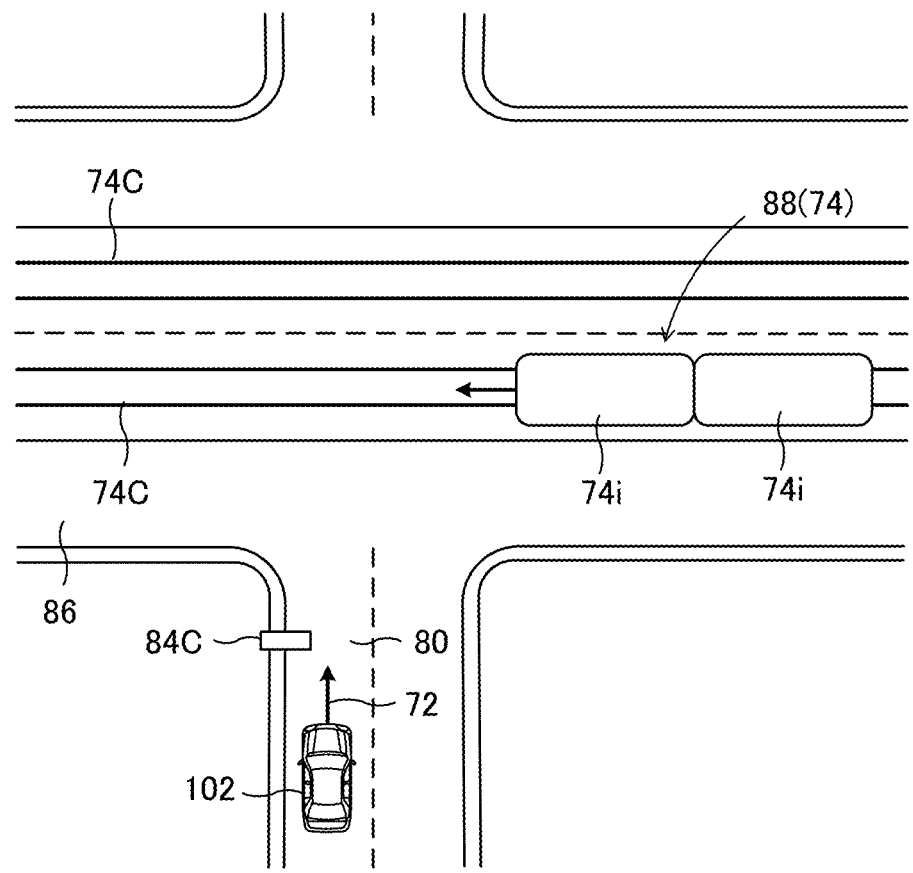
FIG. 5 shows a situation in which a road on which the own vehicle is traveling and a road intersect at a grade, a tram track exists on the road, and a tram as a three-dimensional object approaches the front of the own vehicle to cross the traveling direction of the own vehicle from the front right side.

FIG. 5 shows a situation in which a road 80 on which the own vehicle 102 is traveling and a road 86 intersect at a grade, a tram track 74C exists on the road 86, and a tram 88 as a three-dimensional object 74 approaches the front of the own vehicle to cross the traveling direction of the own vehicle from the front right side. Also, in this situation, affirmative determinations are made in steps S30 to S50, and since there is a road sign 84C indicating that a "tram" is crossing in front of the own vehicle 102, etc., an affirmative determination is made in step S70.

It is to be noted that in the situation shown in FIG. 5, if the three-dimensional object 74 is an articulated bus and there is a road sign or the like indicating that an articulated bus crosses in front of the own vehicle 102, although there is no track of the articulated bus, an affirmative determination may be made in step S70.

In step S80, the CPU decreases the reliability Dr of the three-dimensional object 74 by, for example, multiplying the reliability Dr by a correction coefficient K greater than 0 and less than 0.8. The correction coefficient K may be variably set based on a result of imaging by the camera sensor 12 so that the higher the probability that a track for a rail vehicle does not exist, the smaller the correction coefficient K becomes. Note that the decrease in the reliability Dr is not limited to multiplying the reliability Dr of the three-dimensional object 74 by the correction coefficient K.

In step S90, the CPU determines whether or not there is a risk of the own vehicle 102 colliding with the three-dimensional object 74 in a manner known in the art. When the CPU makes a negative determination, the present control once ends, and when the CPU makes an affirmative determination, the present control proceeds to step S100. For example, a time point ts at which a front end of the three-dimensional object 74 begins to pass in front of the own vehicle 102 and a time point te at which a rear end of the three-dimensional object 74 finishes passing in front of the own vehicle 102 are estimated. Furthermore, a minimum distance between the own vehicle 102 and the three-dimensional object 74 during a period from the time point ts to the time point te is estimated, and when the minimum distance is equal to or less than a preset reference distance (positive constant), it may be determined that there is a risk that the own vehicle 102 will collide with the three-dimensional object 74.

In step S100, the CPU determines whether or not the reliability Dr is greater than or equal to a reference value Drc (for example, a positive constant such as 80% or so), i.e., determines whether or not a collision prevention assistance control should be executed. When the CPU makes a negative determination, the present control once ends, and when the CPU makes an affirmative determination, the present control proceeds to step S110.

In step S110, the CPU executes the collision prevention assistance control. Specifically, the CPU outputs a command signal to the meter ECU 50 to display a visual alert on the display 52 to the effect that the own vehicle 102 may collide with a group of moving bodies that are three-dimensional objects and to sound the buzzer 54 to issue an auditory alert that the own vehicle 102 may collide with the group of moving bodies. Further, the CPU outputs a command signal to the brake ECU 30 to decelerate the own vehicle 102 through automatic braking by the brake device 32, thereby avoiding the collision of the own vehicle 102 with the group of moving bodies. When it is determined that the own vehicle 102 should be accelerated in order to avoid a collision, the own vehicle 102 may be accelerated by automatic acceleration by the drive device 22.

In the embodiment, when it is determined in step S10 that there is a three-dimensional object 74 approaching in front of the own vehicle 102 across the traveling direction of the own vehicle from the front side of the own vehicle, in step S20, the reliability Dr of the three-dimensional object 74 is calculated. When it is determined in steps S30 to S50 that the three-dimensional object 74 is a group of moving bodies forming a row in a number equal to or greater than the reference value, in step S70, it is determined whether or not there is a track for a rail vehicle that intersects the road on which the own vehicle 102 is traveling.

<When a Track for a Rail Vehicle Exists at a Position Higher than the Road on which the Own Vehicle is Traveling>

In step S70, it is determined that there is no track for a rail vehicle that intersects the road 80 on which the own vehicle 102 is traveling, so that in step S80, the reliability Dr is lowered. Even if it is determined in step S90 that the own vehicle 102 is likely to collide with the group of moving bodies 74, in step S100, it is determined that the reliability Dr is less than the reference value Drc. Therefore, the collision prevention assistance control to be executed in step S110 is not executed, so that unnecessary execution of the collision prevention assistance control can be prevented.

For example, as shown in FIG. 3, in a situation in which there is a track 74A for a track vehicle above the road 80 on which the own vehicle 102 is traveling, and a group of moving bodies 74 such as monorails and trains travel along the track 74A, the collision prevention assistance control is not executed. The monorail may be either straddle type or suspension type.

<When the Road on which the Own Vehicle is Traveling Intersects a Track for a Rail Vehicle>

In step S70, it is determined that there is a track for a rail vehicle that intersects the road 80 on which the own vehicle 102 is traveling, so that the reliability Dr is not lowered in step S80. When it is determined in step S90 that the own vehicle 102 is likely to collide with a group of moving bodies 74, it is determined in step S100 that the reliability Dr is equal to or greater than the reference value Drc. Therefore, the collision prevention assistance control is executed in step S110, so that the risk of the own vehicle 102 colliding with the group of moving bodies 74 can be reduced.

For example, even if affirmative determinations are made in steps S30 to S50, as shown in FIGS. 4 and 5, when a track for a train or a tram intersects the road 80 on which the own vehicle 102 is traveling, an affirmative determination is made in step S70. Therefore, when there is a high possibility that the own vehicle 102 will collide with a group of moving bodies 74 such as a train or a tram, the possibility of the own vehicle 102 colliding with the group of moving bodies 74 can be reduced by automatic braking of collision prevention assistance control or the like.

Figure 6:
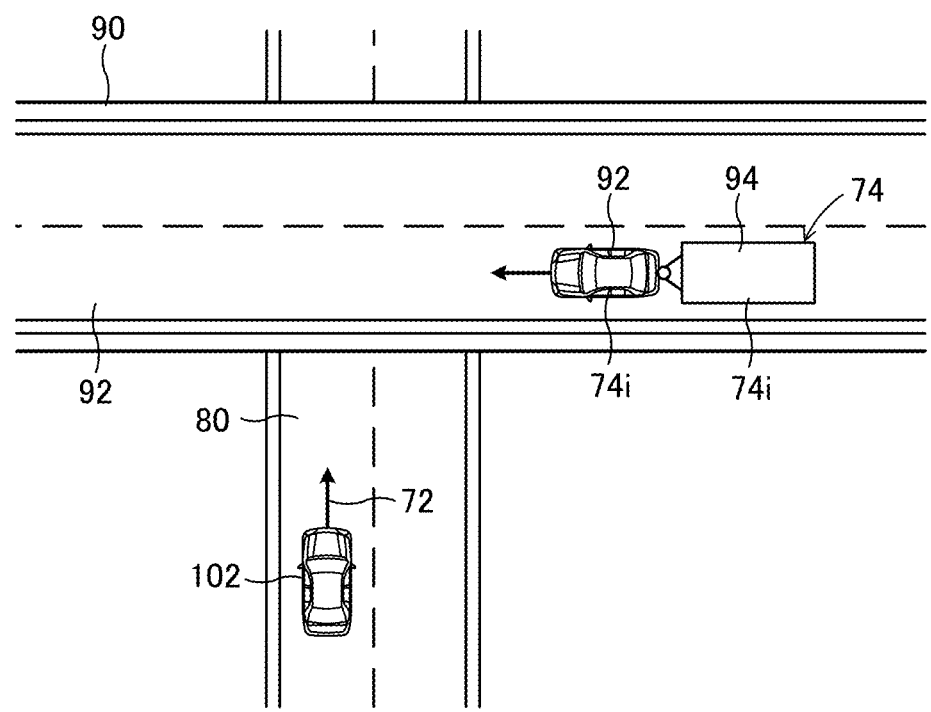
FIG. 6 shows a situation in which there is a viaduct above the road on which the own vehicle is traveling, and a three-dimensional object consisting of a towing vehicle and a towed vehicle approaches the front of the own vehicle along a road of the viaduct.

FIG. 6 shows a situation in which there is a viaduct 90 above the road 80 on which the own vehicle 102 is traveling, and a three-dimensional object 74 consisting of a towing vehicle 92 and a towed vehicle 94 approaches the front of the own vehicle along a road 92 of the viaduct 90. In this situation, affirmative determinations are made in steps S30 and S40, but a negative determination is made in step S50. Therefore, step S70 and subsequent steps are not executed, and conventional collision prevention control is executed in step S60.

As can be seen from the above description, according to the embodiment, it is determined whether or not there is a track for a rail vehicle that intersects the road on which the own vehicle is traveling in front of the vehicle. When it is determined that a three-dimensional object is a group of moving bodies forming a row in a number equal to or greater than the reference value and that there is no track for rail vehicles in front of the own vehicle, execution of the collision prevention assistance control is suppressed.

Therefore, even in a situation where it is determined that the own vehicle may collide with a three-dimensional object, when the three-dimensional object is a group of moving objects that form a row in a number equal to or greater than the reference value, such as trains and monorails, and moves at a height position different from that of the own vehicle, the execution of the collision prevention assistance control is suppressed. Accordingly, it is possible to reduce the possibility that the collision prevention assistance control is performed unnecessarily.

In addition, when it is determined that a three-dimensional object is a group of moving bodies 74 forming a row in a number equal to or greater than the reference value (S30 to S50), and it is determined that a track 74A for a track vehicle exists in front of the own vehicle (S70), the collision prevention assistance control is executed without being suppressed (S110). Therefore, as shown in FIG. 4, for example, in a situation where the own vehicle is approaching a railroad crossing and a train or the like is about to pass in front of the own vehicle, the collision prevention assistance control can prevent the own vehicle from colliding with the train or the like.

In particular, according to the embodiment, when it is determined in step S100 that the reliability Dr is less than the reference value Drc, the collision prevention assistance control to be executed in step S110 is not executed. Therefore, as compared to where the execution of the collision prevention assistance control is suppressed by reducing the control amount of the collision prevention assistance control, it is possible to reliably reduce the risk of unnecessary execution of the collision prevention assistance control.

In particular, according to the embodiment, the determinations in steps S30 to S50 are performed. Therefore, as compared to where any of the determinations in steps S30 to S50 are not performed, it is possible to accurately determine whether or not a three-dimensional object is a group of moving bodies 74 such as trains and monorails forming a row in a number equal to or greater than the reference value. In other words, it is possible to reduce the possibility that a three-dimensional object in which a towing vehicle tows a vehicle to be towed is determined to be a group of moving bodies forming a row in a number equal to or greater than the reference value.

Furthermore, since a radar device capable of detecting a height of a three-dimensional object such as trains and monorails, for example, an expensive radar device having antenna elements arranged at a plurality of positions with different heights, is unnecessary, the collision prevention device can be avoided from becoming expensive.

Although the present disclosure has been described in detail with reference to the specific embodiment, it will be apparent to those skilled in the art that the present disclosure is not limited to the above-described embodiment, and various other embodiments are possible within the scope of the present disclosure.

For example, in the above-described embodiment, when it is determined that a three-dimensional objects are a group of moving bodies forming a row in a number equal to or larger than the reference value (S30 to S50) and it is determined that there is no track for a track vehicle in front of the own vehicle (S70), the collision prevention assistance control (S110) is not executed. That is, no alert is issued and acceleration/deceleration control of the vehicle 102 is not executed, and, as a result, a process equivalent to reducing a control amount of the collision prevention assistance control to zero is performed.

However, the acceleration/deceleration control may be executed with a control amount of the acceleration/deceleration control reduced. In that case, it is possible to reduce an amount of acceleration/deceleration of the own vehicle that is not dependent on a driving operation of a driver, that is, a fluctuation of a vehicle speed that is not intended by the driver.

The alert may be issued with a reduced control amount for the alert. A reduction in the control amount of the alert may be achieved in an audible alert by, for example, reducing its volume, and in a visual alert by reducing a size of a text of the alert or by lowering brightness of the text. Further, a reduction in the control amount of alert may be achieved by reducing the types of alerts, e.g., omitting one of the audible and visual .alerts. In these cases, a degree of appeal of the alerting is reduced, so that it is possible to reduce the possibility that an occupant or occupants will feel annoyed by unnecessary alerting.

In the above-described embodiment, in step S50, it is determined whether or not lengths of all moving bodies 74*i* are substantially the same and intervals between all moving bodies are equal to or less than the reference interval. However, it may be determined whether the lengths and heights of all moving bodies 74*i* are substantially the same and the intervals between all moving bodies are equal to or less than the reference interval. Further, one of the determination whether or not the lengths of all moving bodies 74*i* are substantially the same and the determination whether or not the intervals between all moving bodies are equal to or less than the reference interval may be omitted.

Further, in the above-described embodiment, the collision prevention assistance control is an issuance of an alert and an automatic acceleration/deceleration control, but it may be only one of the issuance of the alert and the automatic acceleration/deceleration control.

What is claimed is:

1. A collision prevention device, comprising:
a radar device configured to detect a three-dimensional object approaching in front of an own vehicle from a front side of the own vehicle; and
an electronic control unit configured to execute a collision prevention assistance control configured to reduce a risk of the own vehicle colliding with the three-dimensional object in response to a determination that the own vehicle is likely to collide with the three-dimensional object, wherein
the electronic control unit includes a determination device configured to determine whether or not there is a track for a rail vehicle that intersects a road on which the own vehicle is traveling in front of the own vehicle, and
the electronic control unit is further configured to:
calculate reliability of the detected three-dimensional object based on a detection result of the radar device;
reduce the reliability so that the higher a probability that a track for a rail vehicle does not exist, the smaller the reliability becomes, in response to a determination that the three-dimensional object is a group of moving bodies forming a row in a number equal to or greater than a reference value and the determination device determines that there is no track for a rail vehicle that intersects the road on which the own vehicle is traveling in front of the own vehicle; and suppress execution of the collision prevention assistance control in response to the reliability being below a reliability reference value.

2. The collision prevention device according to claim 1, wherein
the electronic control unit is configured to determine that the three-dimensional object is a group of moving bodies forming a row in a number equal to or greater than the reference value in response to a determination that a number of moving bodies equal to or greater than the reference value moves in the same direction at the same speed and distances between the moving bodies are equal to or less than a reference distance.

3. The collision prevention device according to claim 2, wherein the electronic control unit is configured to:
execute the collision prevention assistance control in response to:
the reliability is being not below the reliability reference value, and
the determination that the own vehicle is likely to collide with the three-dimensional object, and
suppress execution of the collision prevention assistance control in response to:
the reliability is being below the reliability reference value, and
the determination that the own vehicle is likely to collide with the three-dimensional object.

4. The collision prevention device according to claim 1, wherein
the determination device includes an imaging device configured to capture an image of a front of the own vehicle, and to determine whether or not there is a target in front of the own vehicle that indicates existence of a track for a rail vehicle based on the image captured by the imaging device.

5. A collision prevention method, comprising processes of:
detecting a three-dimensional object approaching from a front side of an own vehicle; and
executing a collision prevention assistance control for reducing a risk of the own vehicle colliding with the three-dimensional object in response to a determination that the own vehicle is likely to collide with the three-dimensional object, wherein
the collision prevention method further comprises processes of:
determining whether or not there is a track for a rail vehicle that intersects a road on which the own vehicle is traveling in front of the own vehicle;
calculating reliability of the detected three-dimensional object based on a detection result of the process of detecting the three-dimensional object;
reducing the reliability so that the higher a probability that a track for a rail vehicle does not exist, the smaller the reliability becomes, in response to a determination that the three-dimensional object is a group of moving bodies forming a row in a number equal to or greater than a reference value and that there is no track for a rail vehicle that intersects the road on which the own vehicle is traveling in front of the own vehicle; and
suppressing execution of the collision prevention assistance control in response to the reliability being below a reliability reference value.

6. The collision prevention method according to claim 5, further comprising a process of:
determining that the three-dimensional object is a group of moving bodies forming a row in a number equal to or greater than the reference value in response to a determination that a number of moving bodies equal to or greater than the reference value moves in the same direction at the same speed and distances between the moving bodies are equal to or less than a reference distance.

7. The collision prevention method according to claim 6, wherein
the collision prevention assistance control is executed in response to:
the reliability is being not below the reliability reference value, and
the determination that the own vehicle is likely to collide with the three-dimensional object, and
execution of the collision prevention assistance control is suppressed in response to:
the reliability is being below the reliability reference value, and
the determination that the own vehicle is likely to collide with the three-dimensional object.

8. The collision prevention method according to claim 5, further comprising processes of:
capturing an image of a front of the own vehicle; and
determining whether or not there is a target in front of the own vehicle that indicates existence of a track for a rail vehicle based on the captured image.

9. A non-transitory computer-readable medium storing therein a collision prevention program that is executable by an electronic control unit (ECU) mounted on an own vehicle to cause the ECU to execute processes of:
detecting a three-dimensional object approaching from a front side of the own vehicle; and
executing a collision prevention assistance control for reducing a risk of the own vehicle colliding with the three-dimensional object in response to a determination that the own vehicle is likely to collide with the three-dimensional object, wherein
the collision prevention program is executable by the ECU to cause the ECU to further execute processes of:
determining whether or not there is a track for a rail vehicle that intersects a road on which the own vehicle is traveling in front of the own vehicle;
calculating reliability of the detected three-dimensional object based on a detection result of the process of detecting the three-dimensional object;
reducing the reliability so that the higher a probability that a track for a rail vehicle does not exist, the smaller the reliability becomes, in response to a determination that the three-dimensional object is a group of moving bodies forming a row in a number equal to or greater than a reference value and that there is no track for a rail vehicle that intersects the road on which the own vehicle is traveling in front of the own vehicle; and
suppressing execution of the collision prevention assistance control in response to the reliability being below a reliability reference value.

10. The non-transitory computer-readable medium according to claim 9, wherein the collision prevention program is executable by the ECU to cause the ECU to further execute a process of:
determining that the three-dimensional object is a group of moving bodies forming a row in a number equal to or greater than the reference value in response to a determination that a number of moving bodies equal to or greater than the reference value moves in the same direction at the same speed and distances between the moving bodies are equal to or less than a reference distance.

11. The non-transitory computer-readable medium according to claim 10, wherein the collision prevention program is executable by the ECU to cause the ECU to:
  execute the collision prevention assistance control in response to:
    the reliability is being not below the reliability reference value, and
    the determination that the own vehicle is likely to collide with the three-dimensional object, and
  suppress execution of the collision prevention assistance control in response to:
    the reliability is being below the reliability reference value, and
    the determination that the own vehicle is likely to collide with the three-dimensional object.

12. The non-transitory computer-readable medium according to claim 9, wherein the collision prevention program is executable by the ECU to cause the ECU to further execute processes of:
  capturing an image of a front of the own vehicle; and
  determining whether or not there is a target in front of the own vehicle that indicates existence of a track for a rail vehicle based on the captured image.

\* \* \* \* \*